(12) United States Patent
Koronthaly et al.

(10) Patent No.: US 8,898,181 B2
(45) Date of Patent: Nov. 25, 2014

(54) SUBSCRIPTION FOR INTEGRATING EXTERNAL DATA FROM EXTERNAL SYSTEM

(75) Inventors: David Koronthaly, Sammamish, WA (US); Rolando Jimenez-Salgado, Redmond, WA (US); Sundaravadivelan Paranthaman, Sammamish, WA (US); Arshish Cyrus Kapadia, Issaquah, WA (US); Wei-Lun Lo, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 540 days.

(21) Appl. No.: 12/820,147

(22) Filed: Jun. 22, 2010

(65) Prior Publication Data

US 2011/0314047 A1 Dec. 22, 2011

(51) Int. Cl.
*G06F 17/30* (2006.01)
*G06F 13/00* (2006.01)

(52) U.S. Cl.
CPC ............ *G06F 17/3048* (2013.01); *G06F 13/00* (2013.01)
USPC ........... 707/765; 707/759; 707/766; 707/802; 711/118; 711/123

(58) Field of Classification Search
CPC .................................. G06F 17/30; G06F 13/00
USPC ......... 707/790–799, 812, 821–822, 713, 718, 707/719, 759, 765, 766, 802; 717/136, 114, 717/140; 709/203–206, 215–220; 711/111–113, 123–126, 118
See application file for complete search history.

(56) References Cited

U.S. PATENT DOCUMENTS

| 6,119,126 | A  | * | 9/2000  | Yee et al. ................................ 1/1 |
| 6,434,554 | B1 | * | 8/2002  | Asami et al. ........................... 1/1 |
| 6,513,112 | B1 | * | 1/2003  | Craig et al. ........................ 713/1 |
| 6,523,036 | B1 | * | 2/2003  | Hickman et al. .............. 707/704 |
| 6,591,266 | B1 |   | 7/2003  | Li et al. |
| 6,996,566 | B1 | * | 2/2006  | George et al. ......................... 1/1 |
| 7,360,025 | B1 |   | 4/2008  | O'Connell et al. |
| 7,505,973 | B2 | * | 3/2009  | Kapadia et al. ....................... 1/1 |
| 7,810,106 | B2 | * | 10/2010 | Kapadia et al. ............... 719/328 |
| 2003/0212863 | A1 | * | 11/2003 | Ganguly et al. .............. 711/118 |
| 2004/0133538 | A1 | * | 7/2004  | Amiri et al. ....................... 707/1 |

(Continued)

OTHER PUBLICATIONS

Chiyoung Seoet al. "An efficient inverted index technique for XML documents using RDBMS",Information and Software Technology 45 (2003) 11-22.*

(Continued)

*Primary Examiner* — Srirama Channavajjala
(74) *Attorney, Agent, or Firm* — Tom Wong; Jim Ross; Micky Minhas

(57) ABSTRACT

Technologies are described herein for integrating external data from an external system into a client system. A subscription filed is selected. The subscription filed may include a read method and a query method. The read method may define fields of a client cache operating on the client system. The query method may be executed to retrieve, from the external system, field values corresponding to at least a subset of the fields. Upon executing the query method, the read method may also be executed to retrieve, from the external system, additional field values corresponding to a remaining subset of the fields that were not retrieved by executing the query method. The client cache is populated with the field values and the additional field values according to the fields.

19 Claims, 4 Drawing Sheets

(56) References Cited

U.S. PATENT DOCUMENTS

| | | |
|---|---|---|
| 2005/0182758 A1* | 8/2005 | Seitz et al. ............ 707/3 |
| 2008/0208806 A1 | 8/2008 | Dalfo et al. |
| 2009/0049013 A1* | 2/2009 | Kumbi et al. .......... 707/3 |
| 2009/0171679 A1 | 7/2009 | Salgado et al. |
| 2010/0036805 A1* | 2/2010 | Blamer et al. ......... 707/3 |

OTHER PUBLICATIONS

"What's New: Business Connectivity Services (BCS)", Retrieved at << http://msdn.microsoft.com/en-us/library/ee557658(office.14).aspx >>, 2010, pp. 3.

Robinson, Lionel., "Surfacing Business Data in Word 2010 using External Data Columns and the External Item Content Control", Retrieved at << http://blogs.msdn.com/bcs/archive/2010/02/15/surfacing-business-data-in-word-2010-using-external-data-columns-and-the-external-item-content-control.aspx >>, Feb. 15, 2010, pp. 5.

Tajeshwar., "SharePoint Memory Dump", Retrieved at << http://blogs.msdn.com/taj/archive/2009/10/20/consuming-external-data-using-sharepoint-2010-business-connectivity-services-bcs-and-office-excel-2010-add-in.aspx >>, Oct. 20, 2009, pp. 19.

Bosch, et al., "A Microsoft SharePoint 2007 custom field type for Microsoft CRM Dynamics 4.0", Retrieved at << http://www.u2u.be/Res/Article.aspx?ART=CRMSharePointCustomField >>, Retrieved Date: Apr. 5, 2010, pp. 11.

"Extension: External Data", Retrieved at << http://www.mediawiki.org/wiki/Extension:External_Data >>, Retrieved Date: Apr. 5, 2010, pp. 10.

* cited by examiner

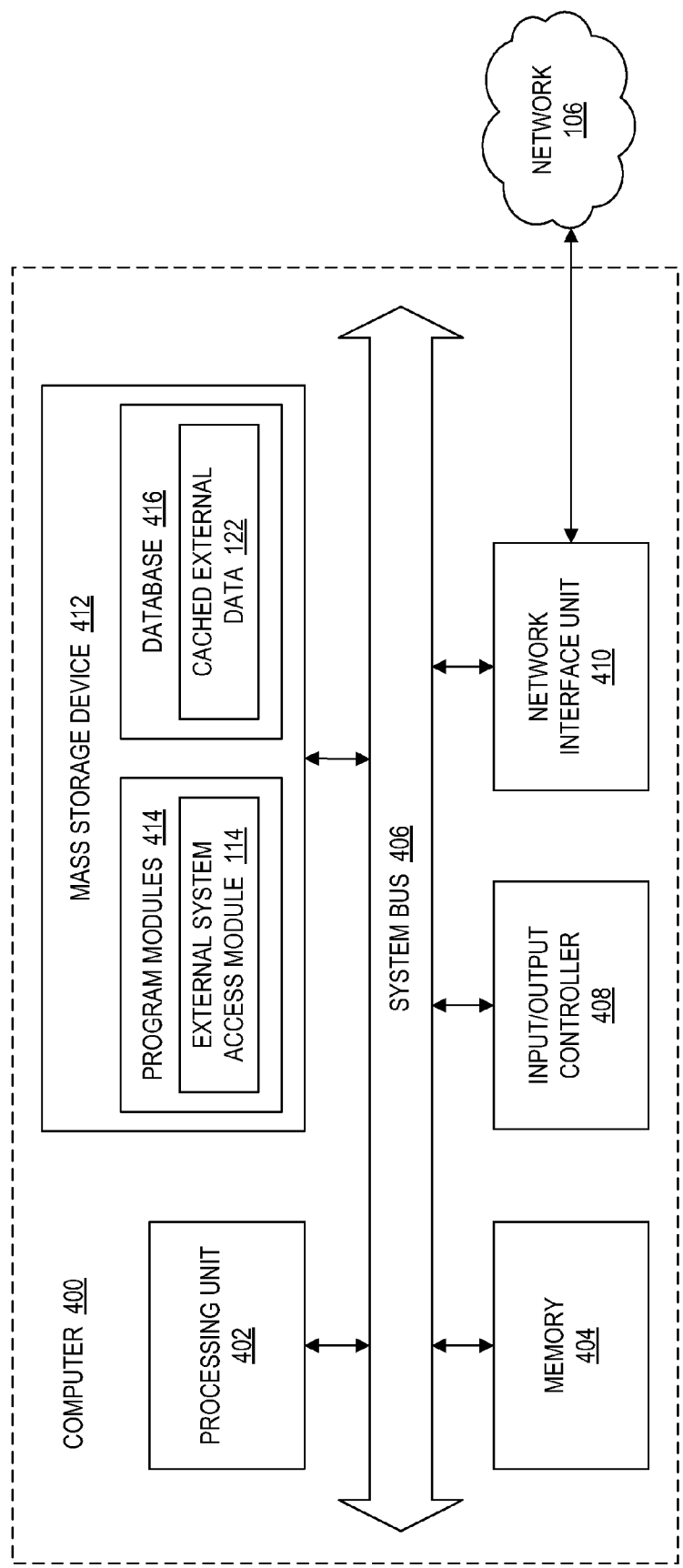

SUBSCRIPTION FOR INTEGRATING EXTERNAL DATA FROM EXTERNAL SYSTEM

BACKGROUND

Users of a client system may desire the ability to connect to external data sources over a network and to integrate external data from these external data sources into client applications, such as office productivity applications, executing on the client system. In this way, the users of the client system can view and interact with the external data through the client applications even when the client system is disconnected from the network. The external data sources may refer to data sources that are external to the client system. For example, a line-of-business ("LOB") system external to the client system may contain a list of customers. A business user may desire to view and interact with the customer data offline through a personal management application executing on the client system.

Conventionally, end users may connect to the external data sources, such as the LOB system, through application program interfaces ("APIs") provided by the external data sources. Through the APIs, the client system can retrieve external data from the external data sources via the network. However, the APIs typically assume online access and may not function when the client system is offline. In some cases, the APIs may not support user-defined processes for retrieving external data in an automated manner. The APIs also may not support user-defined processes for synchronizing data between the client system and the external data sources in an automated manner.

It is with respect to these considerations and others that the disclosure made herein is presented.

SUMMARY

Technologies are described herein for integrating external data from an external system into a client system. Through the utilization of the technologies and concepts presented herein, a user can define a subscription file on a client system. The subscription file may control the operations of a program module executing on the client system with respect to retrieving external data from an external system over a network. Through the subscription file, the program module can retrieve the external data in an automated manner without requiring that client applications executing on the client system utilize any specialized APIs provided by the external system.

In an example technology, a client system having a memory and a processor is configured to integrate external data from an external system into the client system over a network. The client system may select a subscription file. The subscription files may include a read method and a query method. The read method may define fields of a client cache operating on the client system. The client system may execute the query method to retrieve, from the external system, field values corresponding to at least a subset of the fields. Upon executing the query method, the client system may also execute the read method to retrieve, from the external system, additional field values corresponding to a remaining subset of the fields that were not retrieved by executing the query method. The client system may populate the client cache with the field values and the additional field values according to the fields.

It should be appreciated that the above-described subject matter may also be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 4 is a computer architecture diagram showing an illustrative computer hardware architecture for a computing system capable of implementing the embodiments presented herein.

DETAILED DESCRIPTION

Figure 1:
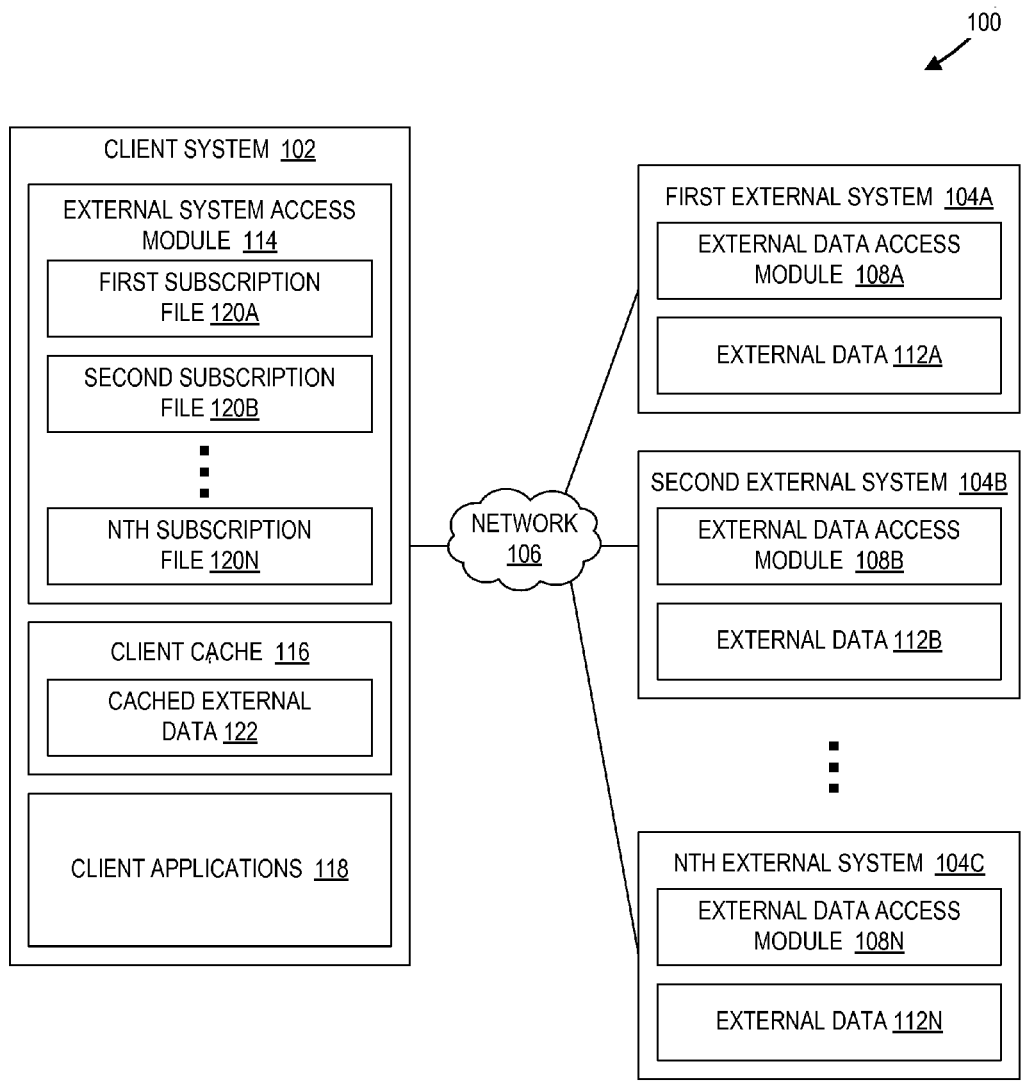
FIG. 1 is a block diagram of an example network architecture configured to integrate external data from an external system into a client system, in accordance with some embodiments.

The following detailed description is directed to technologies for integrating external data from an external system into a client system. In accordance with some embodiments described herein, a subscription file may be configured to include a read method, a query method, an explicit identity, an association method, and/or a refresh rate. The read method may define a schema that specifies fields to be cached in a client cache operating on the client system. The client system may execute the query method, the read method, the explicit identity, and/or the association method to retrieve field values corresponding to the fields from an external system over a network. The client system may populate the client cache with the retrieved field values. The client system may execute the query method to retrieve a collection of items of an entity from the external system. An entity may refer to a business data type (e.g., customer, order, employee etc.). Each item of the entity may refer an instance of the entity. For example, an item of a customer entity may refer to a particular customer. Fields of an entity may refer to types of field values associated with the entity. For example, the customer entity may include one or more of the following fields: customer identifier ("ID"), name, address, phone number, and industry.

When the client system executes the query method, the client system may retrieve only a subset of field values associated with each item in the collection of items. For example, when the client system executes a query method associated with the customer entity, the client system may retrieve only customer IDs. The query method may also include a parameter that defines the items retrieved. For example, a query method associated with the customer entity may have a parameter that specifies the state of Washington. In this case, when the client system executes the query method having the parameter that specifies the state of Washington, the client system may retrieve only customers from the state of Washington. The client system may execute the read method to retrieve additional field values that were not retrieved by executing the query method. In the previous example, the client system may execute the read method to retrieve the name, address, phone number, and industry for each of the customer IDs retrieved by executing the query method.

The client system may utilize the explicit identity to retrieve specific items. For example, an explicit identity associated with the customer entity may specify customer IDs #1234 and #5678. In this case, the client system may retrieve field values corresponding to the customer IDs #1234 and #5678, in addition to the field values retrieved by executing the query method. The client system may execute the association method to retrieve associated items from related entities. For example, an association method associated with the customer entity may specify an association between the customer entity and an order entity. In this case, when the client system executes the association method, the client system may retrieve orders corresponding to the retrieved customer IDs. The refresh rate may specify a frequency with which the client system updates the client cache.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration, specific embodiments, or examples. Referring now to the drawings, in which like numerals represent like elements through the several figures, a computing system and methodology for integrating external data from an external system into a client system will be described. In particular, FIG. 1 illustrates an example computer network architecture 100 configured to integrate external data from an external system into a client system, in accordance with some embodiments. The computer network architecture 100 may include a client system 102 and one or more external systems, such as a first external system 104A, a second external system 104B, and an Nth external system 104C. The first external system 104A, the second external system 104B, and the Nth external system 104C may be collectively referred to as external systems 104. The external systems 104 are referred to as "external" because the external systems 104 are external to the client system 102. The client system 102 and the external systems 104 may be communicatively coupled via a network 106.

Each of the external systems 104 may include an external data access module 108A-108N and external data 112A-112N. The external data 112A-112N may or may not be stored or persisted on the external system systems 104. The external data access modules 108A-108N may be collectively referred to as external data access modules 108. The external data 112A-112N may be collectively referred to as external data 112.

The client system 102 may include an external system access module 114, a client cache 116, and one or more client applications 118. The external system access module 114 may include one or more subscription files, such as a first subscription file 120A, a second subscription file 120B, and an Nth subscription file 120N. The subscription files 120A-120N may be collectively referred to as subscription files 120. The client cache 116 may be configured to store cached external data 122 that is retrieved from the external systems 104. The cached external data 122 may comprise at least a portion of the external data 112.

The external systems 104 may include any suitable LOB systems adapted to provide at least remote read access to the external data 112 over the network 106. Examples of the external systems 104 may include, but are not limited to, Structured Query Language ("SQL") database servers, relational database management systems ("RDMSs"), customer relation management ("CRM") systems, enterprise resource planning ("ERP") systems, business intelligence ("BI") systems, web services, custom applications, and the like. Each of the external systems 104 may provide one or more different types of the external data 112 depending on the particular external system 104. Further, some of the external data 112 between the external systems 104 may or may not overlap.

The external system access module 114 may be configured to retrieve the cached external data 122 from the external systems 104 via the external data access modules 108. The external system access module 114 may retrieve the cached external data 122 according to the subscription files 120. Each of the subscription files 120 may define at least one entity (e.g., customer, order, employee, etc.). Each of the subscription files 120 may include a read method, a query method, an explicit identity, an association method, and/or a refresh rate. Each of the subscription files 120 may be encoded in extensible markup language ("XML") or other suitable encoding technique. The content of the subscription files 120, the content of the external data 112, the content of the client cache 116, and the operation of the external system access module 114 with respect to the subscription files 120, the external data 112, and the client cache 116 are described in greater detail below with reference to FIGS. 2A-2C.

Upon retrieving the cached external data 122 from the external systems 104, the external system access module 114 may store the retrieved cached external data 122 in the client cache 116. The client cache 116 may be implemented as any suitable local data store. In one embodiment, the client cache 116 is implemented as an embedded SQL database or other suitable relational database. By storing the cached external data 122 in the client cache 116, the client applications 118 can view and interact with the cached external data 122 even when the client system 103 is offline (i.e., not connected to the network 106). Examples of the client applications 118 may include, but are not limited to, office productivity applications.

Figure 2:
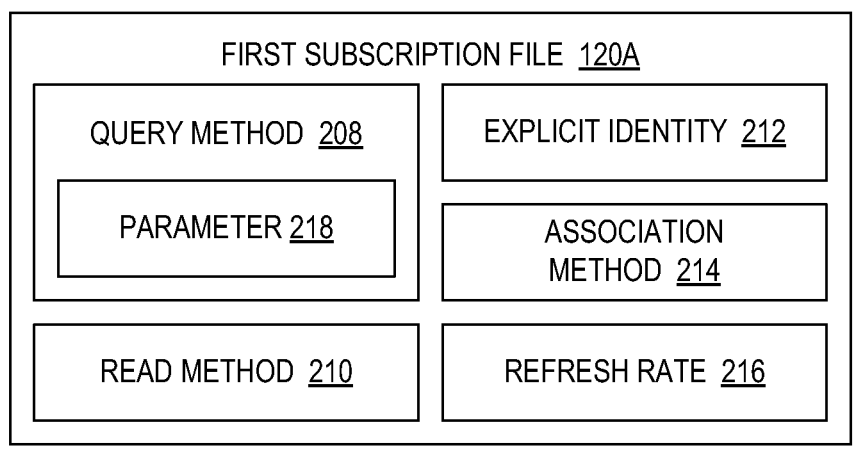
FIG. 2 is a block diagram of an example subscription file, in accordance with some embodiments.

Referring now to FIG. 2, additional details will be provided regarding the content of the subscription files 120, the content of the external data 112, and the content of the client cache 116. In particular, FIG. 2 illustrates an example configuration of at least one of the subscription files 120, such as the first subscription file 120A, in accordance with some embodiments. The first subscription file 120A includes a query method 208, a read method 210, an explicit identity 212, an association method 214, and a refresh rate 216. In some embodiments, the query method 208 may include a parameter 218. In other embodiments, the query method 208 may not include the parameter 218.

The read method 210 may define a schema that specifies fields to be cached in the client cache 116. In some embodiments, the schema may be defined declaratively through metadata. The external system access module 114 may execute the query method 208, the read method 210, the explicit identity 212, and/or the association method 214 to retrieve field values corresponding to the fields from one or more of the external systems 104. The external system access module 114 may populate the client cache 116 with the retrieved field values. The external system access module 114 may execute the query method 208 to retrieve a collection of items of an entity from one or more of the external systems 104. An entity may refer to a business data type (e.g., customer, order, employee etc.). Each item of the entity may refer an instance of the entity. For example, an item of a customer entity may refer to a particular customer. Fields of an entity may refer to types of field values associated with the entity. For example, the customer entity may include one or more of the following fields: customer identifier ("ID"), name, address, phone number, and industry.

When the external system access module 114 executes the query method 208, the external system access module 114 may retrieve only a subset of field values associated with each item in the collection of items. For example, when the external system access module 114 executes a query method associated with the customer entity, the external system access module 114 may retrieve only customer IDs. The query method 208 may also include the parameter 218 that defines the items retrieved. For example, a query method associated with the customer entity may have a parameter that specifies the state of Washington. In this case, when the external system access module 114 executes the query method having the parameter that specifies the state of Washington, the external system access module 114 may retrieve only customers from the state of Washington. The external system access module 114 may execute the read method 210 to retrieve additional field values that were not retrieved by executing the query method 208. In the previous example, the external system access module 114 may execute read method to retrieve the name, address, phone number, and industry for each of the customer IDs retrieved by executing the query method.

The external system access module 114 may utilize the explicit identity 212 to retrieve specific items. For example, an explicit identity associated with the customer entity may specify customer IDs #1234 and #5678. In this case, the external system access module 114 may retrieve field values corresponding to the customer IDs #1234 and #5678, in addition to the field values retrieved by executing the query method. The external system access module 114 may execute the association method 214 to retrieve associated items from related entities. For example, an association method associated with the customer entity may specify an association between the customer entity and an order entity. In this case, when the external system access module 114 executes the association method, the external system access module 114 may retrieve orders corresponding to the retrieved customer IDs. In some embodiments, the association method 214 may also accept parameters. The refresh rate 216 may specify a frequency with which the external system access module 114 updates the client cache 116. In some embodiments, the refresh rate 216 may operate in conjunction or in addition to a schedule (not shown). The schedule may specify when the external system access module 114 performs the query method 208, the read method 210, the explicit identity 212, and/or the association method 214 in the subscription files 120.

In some embodiments, more than one of the subscription files 120 may utilize the same read method 210. For example, the second subscription file 120B may also include the read method 210. When the external system access module 114 executes the read method 210 in the second subscription file 120B, the external system access module 114 may retrieve at least some of the same fields that were retrieved when the external system access module 114 executed the read method 202 in the first subscription file 120A. In such a case, the external system access module 114 may remove any overlapping fields such that each field is included only once in the client cache 116.

In some embodiments, the parameter 218 may include a wildcard, a comparison, and/or a strict limit. Examples of wildcards may include employees whose last names start with "W" and employees having an employee ID number ending in "100". Examples of comparisons may include customers from the state of Georgia, customers residing in a zip code equal to 30309, customers having a customer ID number greater than 10,000, and employees having a salary less than 100,000. An example of a strict limit may include "return no more than 100 items". The first subscription file 120A may include multiple instances of the same query method 208, each instance having a different parameter value in order to retrieve different items.

In some embodiments, the refresh rate 216 may specify a frequency at which the external system access module 114 performs the query method 208 and/or the read method 210 to refresh (i.e., update the values of) the client cache 116. If the first subscription file 120A includes multiple query methods, each query method and/or read method may have a corresponding refresh rate. Alternatively, the first subscription file 120A may have a single refresh rate that applies to each query method and/or read method. The refresh rate 216 may be automatically adjusted as needed to accommodate periods where access to the network 106 is unavailable and/or to accommodate other subscription files 120B-120N.

In some embodiments, the client cache 116 may be refreshed in chronological order. That is, the client cache 116 may be refreshed in a round robin manner such that older data are refreshed before newer data. Thus, if the refresh rate 216 has expired for two or more items, the external system access module 114 may be configured to update the stalest item first and chronologically proceeding to less stale items. By refreshing items in chronological order, no single item is left "starving" for a refresh during times when the network 106 is sporadically available.

Irrespective of the refresh rate 216, the external system access module 114 may also refresh the client cache 116 when an item is incomplete (e.g., contains no value). For example, when the external system access module 114 executes a query method associated with the customer entity, the external system access module 114 may retrieve customer IDs and names, but not corresponding addresses. In this case, the external system access module 114 may execute the read method again in order to retrieve the corresponding addresses, even though the refresh rate 216 has not expired. In some embodiments, the external system access module 114 may place a higher priority on refreshing incomplete items over cache items that have expired according to the refresh rate 216.

Also irrespective of the refresh rate 216, the external system access module 114 may further refresh an item the client cache 116 when the corresponding item has been updated on the external systems 104. For example, the external data access modules 108 may provide indications when one or more of items have been updated on the external systems 104. Upon receiving these indications, the external system access module 114 may execute the query method 208 and/or the read method 210 again in order to retrieve at least the updated items. In some embodiments, the external system access module 114 may place a higher priority on refreshing updated items over stale items that have expired according to the refresh rate 216.

The external system access module 114 may also delete an item in the client cache 116 when the corresponding item has been deleted on the external systems 104. For example, the external data access modules 108 may provide indications when one or more of the items have been deleted on the external systems 104. Upon receiving these indications, the external system access module 114 may delete the deleted items in the client cache 116.

In some embodiments, the query method 208 may retrieve version numbers or some other suitable status identifier (e.g., hash value, date of current update, etc.) corresponding to the external data 112. When the external system access module 114 executes the query method 208 again in order to perform a refresh, the external system access module 114 may compare the version numbers of the items in the external systems 104 and the items in the client cache 116. For newer items having a version number that is more current than the version numbers of older items in the client cache 116, the external system access module 114 may replace the older items with the newer items. In some embodiments, the external system access module 114 may execute or schedule an execution of the real method 210 in order to retrieve the newer data. However, if the version numbers are identical, then the external system access module 114 may suppress execution or reschedule the execution of the read method 210 because the client cache 116 already contains the most up-to-date data. The version information may be contained in the fields of each time, and the comparison of version information may be done on a per item items, even when the query method 208 returns multiple items. Through the utilization of version numbers, the external system access module 114 can write to the client cache 116 only when necessary.

In some embodiments, the external system access module 114 may be configured to share the same items across multiple subscription files. For example, the first subscription file 120A and the second subscription file 120B may retrieve at least some of the same items. When the external system access module 114 executes the first subscription file 120A to retrieve items, the external system access module 114 may share any common items with the second subscription file 120B. In this way, when the external system access module 114 executes the second subscription file 120B, the external system access module 114 can forego executing any methods that retrieve the common items.

In some embodiments, when the client applications 118 access the client cache 116, the client applications 118 may create new items in the client cache 116. When the client applications 118 create the new items, the external system access module 114 may update the subscription files 120 to record these new items as temporary items. If these new items are later created on the external systems 104, the subscription files 120 may convert the temporary items into regular items, which can be refreshed according to the subscription files 120.

Figure 3:
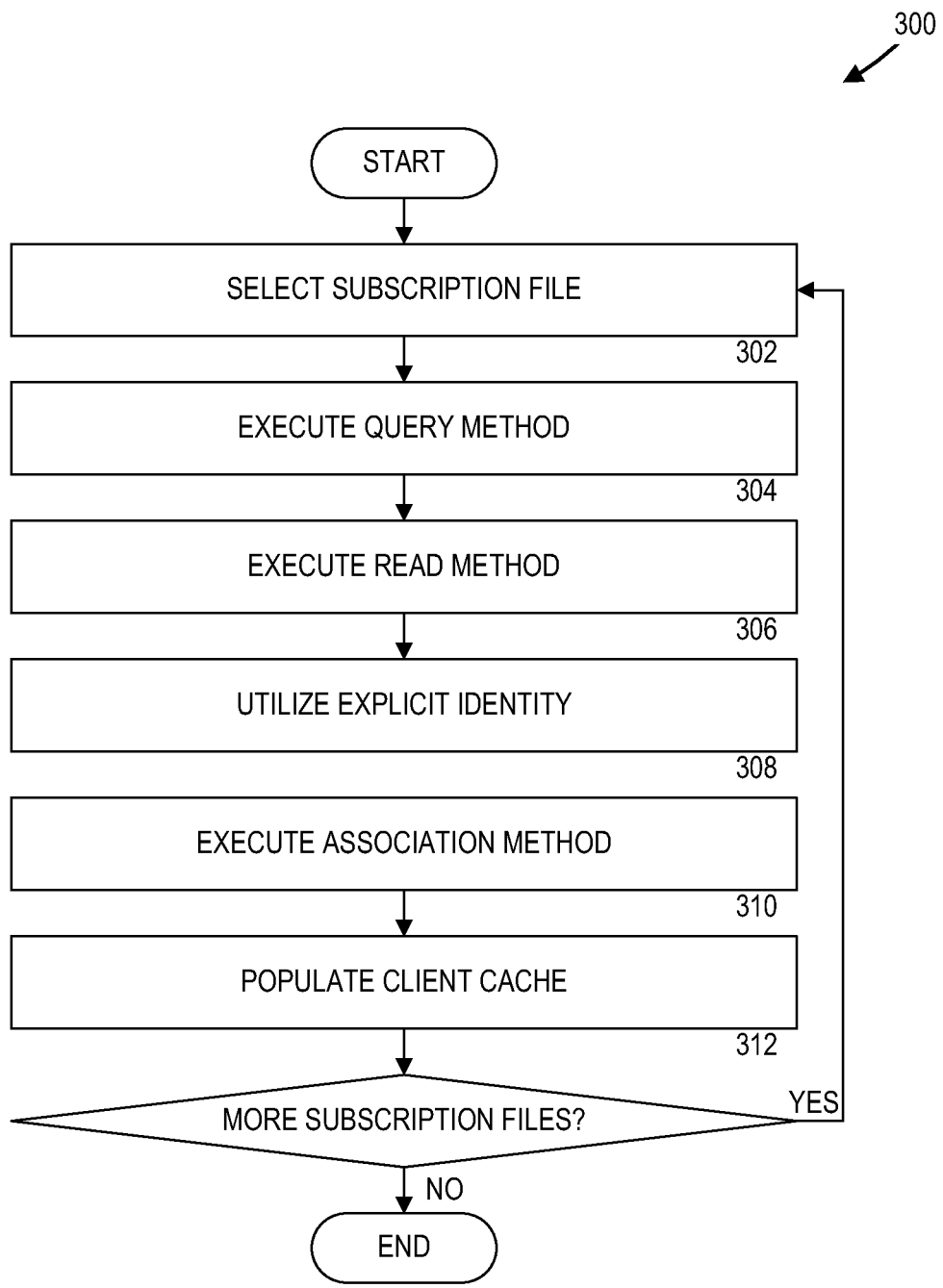
FIG. 3 is a flow diagram showing an example method for integrating external data from an external system into a client system, in accordance with some embodiments.

Referring now to FIG. 3, additional details regarding the operation of the external system access module 114 will be described. In particular, FIG. 3 is a flow diagram illustrating a method for integrating external data from an external system into a client system, in accordance with some embodiments. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts, and modules may be implemented in software, in firmware, in special purpose digital logic, and any combination thereof. It should be appreciated that more or fewer operations may be performed than shown in the figures and described herein. These operations may also be performed in a different order than those described herein.

In FIG. 3, a routine 300 begins at operation 302, where the external system access module 114 selects one of the subscription files 120, such as the first subscription file 120A. The routine 300 then proceeds to operation 304, where the external system access module 114 executes the query method 208 in the subscription file 120A. An example query method for the customer entity may be "GetCustomers." When the external system access module 114 executes "GetCustomers," the external system access module 114 may retrieve multiple customer IDs corresponding to multiple customers. In some embodiments, the query method may also include the parameter 218. When the external system access module 114 executes the query method 208 in the subscription file 120A, the routine 300 may proceed to operation 306.

At operation 306, the external system access module 114 may execute the read method 210. An example read method for the customer entity may be "GetCustomerDetails." When the external system access module 114 executes the read method 210, the external system access module 114 may retrieve other field values that were not retrieved when the external system access module 114 executed the query method 208. For example, when the external system access module 114 executes "GetCustomerDetails," the external system access module 114 may retrieve addresses, phone numbers, and industries corresponding to the customer IDs retrieved through the query method 208. When the external system access module 114 executes the read method 210 in the subscription file 120A, the routine 300 may proceed to operation 308.

At operation 308, the external system access module 114 may utilize the explicit identity 212 to retrieve specific items. For example, the explicit identity 212 may specify a particular customer by customer ID. This customer may not be retrieved through the query method 208. As a result, the external system access module 114 may retrieve field values associated with the customer by utilizing the explicit identity 212. When the external system access module 114 utilizes the explicit identity 212 to retrieve specific items, the routine 300 may proceed to operation 310.

At operation 310, the external system access module 114 may execute the association method 214 to retrieve associated items from related entities. For example, an association method associated with the customer entity may specify an association between the customer entity and an order entity. In this case, when the external system access module 114 executes the association method, the external system access module 114 may retrieve orders corresponding to the retrieved customer IDs. When the external system access module 114 executes the association method 214 to retrieve associated items from related entities, the routine 300 may proceed to operation 312.

At operation 312, the external system access module 114 populates the client cache 116 may with the items retrieved through the query method 208, the read method 210, the explicit identity 212, and/or the association method 214. In some cases, the external system access module 114 may populate the client cache 116 only when field values for each of the fields have been retrieved. The external system access module 114 may populate the items according to the fields. For example, the client cache 116 may contain a table where each row of the table corresponds to an item of the entity, each column corresponds to a field, and each cell corresponds to a field value. The external system access module 114 may also merge any overlapping items. When the external system access module 114 populates the client cache 116 based on the first subscription file 120A, the external system access module 114 can determine whether additional subscription files, such as the second subscription file 120B, are left to be executed. If the external system access module 114 determines that additional subscription files are left to be executed, the external system access module 114 proceeds back to operation 302. Operations 302-312 may be repeated for each additional subscription file associated with the entity. If the external system access module 114 determines that no additional subscription files are left to be executed, then the routine 300 ends.

Turning now to FIG. 4, an example computer architecture diagram showing a computer 400 is illustrated. Examples of the computer 400 may include the client system 102 and the external systems 104. The computer 400 may include a central processing unit ("CPU") 402, a system memory 404, and a system bus 406 that couples the memory 404 to the processing unit 402. The computer 400 may further include a mass storage device 412 for storing one or more program modules 414 and a database 416. Examples of the program modules 414 may include the external system access module 114 and the external data access modules 108. Examples of the database 416 may include the client cache 116 and the external systems 104. For example, the database 416 may store the cached external data 122. The mass storage device 412 may be connected to the CPU 402 through a mass storage controller (not shown) connected to the bus 406. The mass storage device 412 and its associated computer-storage media may provide non-volatile storage for the computer 400. Although the description of computer-storage media contained herein refers to a mass storage device, such as a hard disk or CD-ROM drive, it should be appreciated by those skilled in the art that computer-storage media can be any available computer storage media that can be accessed by the computer 400.

By way of example, and not limitation, computer-storage media may include volatile and non-volatile, removable and non-removable media implemented in any method or technology for the non-transitory storage of information such as computer-storage instructions, data structures, program modules, or other data. For example, computer-storage media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 400.

According to various embodiments, the computer 400 may operate in a networked environment using logical connections to remote computers through a network such as the network 106. The computer 400 may connect to the network 106 through a network interface unit 410 connected to the bus 406. It should be appreciated that the network interface unit 410 may also be utilized to connect to other types of networks and remote computer systems. The computer 400 may also include an input/output controller 408 for receiving and processing input from a number of input devices (not shown), including a keyboard, a mouse, a microphone, and a game controller. Similarly, the input/output controller 408 may provide output to a display or other type of output device (not shown).

The bus 406 may enable the CPU 402 to read code and/or data to/from the mass storage device 412 or other computer-storage media. The computer-storage media may represent apparatus in the form of storage elements that are implemented using any suitable technology, including but not limited to semiconductors, magnetic materials, optics, or the like. The computer-storage media may represent memory components, whether characterized as RAM, ROM, flash, or other types of technology. The computer-storage media may also represent secondary storage, whether implemented as hard drives or otherwise. Hard drive implementations may be characterized as solid state, or may include rotating media storing magnetically-encoded information.

The program modules 414 may include software instructions that, when loaded into the CPU 402 and executed, cause the computer 400 to integrate external data from an external system into a client system. The program modules 414 may also provide various tools or techniques by which the computer 400 may participate within the overall systems or operating environments using the components, flows, and data structures discussed throughout this description. For example, the program modules 414 may implement interfaces for integrating external data from an external system into a client system.

In general, the program modules 414 may, when loaded into the processing unit 402 and executed, transform the processing unit 402 and the overall computer 400 from a general-purpose computing system into a special-purpose computing system customized to integrate external data from an external system into a client system. The processing unit 402 may be constructed from any number of transistors or other discrete circuit elements, which may individually or collectively assume any number of states. More specifically, the processing unit 402 may operate as a finite-state machine, in response to executable instructions contained within the program modules 414. These computer-executable instructions may transform the processing unit 402 by specifying how the processing unit 402 transitions between states, thereby transforming the transistors or other discrete hardware elements constituting the processing unit 402.

Encoding the program modules 414 may also transform the physical structure of the computer-storage media. The specific transformation of physical structure may depend on various factors, in different implementations of this description. Examples of such factors may include, but are not limited to: the technology used to implement the computer-storage media, whether the computer-storage media are characterized as primary or secondary storage, and the like. For example, if the computer-storage media are implemented as semiconductor-based memory, the program modules 414 may transform the physical state of the semiconductor memory, when the software is encoded therein. For example, the program modules 414 may transform the state of transistors, capacitors, or other discrete circuit elements constituting the semiconductor memory.

As another example, the computer-storage media may be implemented using magnetic or optical technology. In such implementations, the program modules 414 may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. Other transformations of physical media are possible without departing from the scope of the present description, with the foregoing examples provided only to facilitate this discussion.

Based on the foregoing, it should be appreciated that technologies for integrating external data from an external system into a client system are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method for integrating external data from an external system into a client system, the method comprising computer-implemented operations for:
    selecting a subscription file, the subscription file comprising a read method and a query method, the read method defining fields of a client cache operating in the client system;
    executing the query method to retrieve, from the external system, field values corresponding to at least a subset of the fields;
    upon executing the query method, executing the read method to retrieve, from the external system, additional field values corresponding to a remaining subset of the fields that were not retrieved by executing the query method; and
    populating the client cache with the field values and the additional field values according to the fields.

2. The computer-implemented method of claim 1, wherein the subscription file further comprises an association method; wherein the method further comprises computer-implemented operations for executing the association method to retrieve second additional field values from related entities; and wherein populating the client cache with the field values and the additional field values according to the fields comprises populating the client cache with the field values, the additional field values, and the second additional field values according to the fields.

3. The computer-implemented method of claim 1, wherein the subscription file further comprises an explicit identity; wherein the method further comprises computer-implemented operations for utilizing the explicit identity to retrieve third additional field values by specific identifier; and wherein populating the client cache with the field values and the additional field values according to the fields comprises populating the client cache with the field values, the additional field values, and the third additional field values, according to the fields.

4. The computer-implemented method of claim 1, wherein the query method is associated with a parameter that defines the field values retrieved; and wherein executing the query method in the subscription file to retrieve, from the external system, field values corresponding to at least a subset of the fields comprises executing the query method in the subscription file according to the parameter to retrieve, from the external system, the defined field values corresponding to at least a subset of the fields.

5. The computer-implemented method of claim 1, wherein the query method is associated with a refresh rate; wherein executing the query method in the subscription file to retrieve, from the external system, field values corresponding to at least a subset of the fields comprises associating the refresh rate with the field values; and wherein the method further comprises computer-implemented operations for refreshing the field values according to the refresh rate.

6. The computer-implemented method of claim 1, the method further comprising computer-implemented operations for:
    selecting a second subscription file, the second subscription file comprising the read method and a second query method,
    executing the second query method to retrieve, from the external system, second field values corresponding to at least a second subset of the fields;
    upon executing the second query method, executing the read method to retrieve, from the external system, second additional field values corresponding to a remaining subset of the fields that were not retrieved by executing the second query method; and
    populating the client cache with the second field values and the second additional field values according to the fields.

7. The computer-implemented method of claim 1, the method further comprising computer-implemented operations for merging overlapping results in the retrieved field values and additional field values.

8. The computer-implemented method of claim 1, the method further comprising computer-implemented operations for:
    receiving an indication that a corresponding representation of at least one of the retrieved field values or additional field values has been updated on the external system; and
    in response to receiving the indication, refreshing at least one of the retrieved field values or additional field values in the client cache.

9. The computer-implemented method of claim 1, the method further comprising computer-implemented operations for:
    receiving an indication that a corresponding representation of at least one of the retrieved field values or additional field values has been deleted on the external system; and
    in response to receiving the indication, deleting the at least one of the retrieved field values or additional field values from the client cache.

10. The computer-implemented method of claim 1, wherein the subscription file comprises an extensible markup language ("XML") file.

11. The computer-implemented method of claim 1, wherein the client cache comprises a relational database.

12. A computer system, comprising:
    a processor;
    a memory communicatively coupled to the processor; and
    a program module (i) which executes in the processor from the memory and (ii) which, when executed by the processor, causes the computer system to integrate external data from an external system into a client system by
        selecting a subscription file, the subscription file comprising a read method, a query method, and an association method, the read method defining fields of a client cache operating in a client system;

executing the query method to retrieve, from the external system, field values corresponding to at least a subset of the fields;

upon executing the query method, executing the read method to retrieve, from the external system, additional field values corresponding to a remaining subset of the fields that were not retrieved by executing the query method;

executing the association method to retrieve second additional field values from related entities; and populating the client cache with the field values, the additional field values, and the second additional field values according to the fields.

13. The computer system of claim 12, wherein the subscription file further comprises an explicit identity; wherein the program module, when executed by the processor, further causes the computer system to integrate external data from the external system into the client system by utilizing the explicit identity to retrieve third additional field values by specific identifier; and wherein populating the client cache with the field values, the additional field values, and the second additional field values according to the fields comprises populating the client cache with the field values, the additional field values, the second additional field values, and the third additional field values, according to the fields.

14. The computer system of claim 12, wherein the query method is associated with a parameter that defines the field values retrieved; and wherein executing the query method in the subscription file to retrieve, from the external system, field values corresponding to at least a subset of the fields comprises executing the query method in the subscription file according to the parameter to retrieve, from the external system, the defined field values corresponding to at least a subset of the fields.

15. The computer system of claim 12, wherein the query method is associated with a refresh rate; wherein executing the query method in the subscription file to retrieve, from the external system, field values corresponding to at least a subset of the fields comprises associating the refresh rate with the field values; and wherein the program module, when executed by the processor, further causes the computer system to integrate external data from the external system into the client system by refreshing the field values according to the refresh rate.

16. The computer system of claim 12, wherein the program module, when executed by the processor, further causes the computer system to integrate external data from the external system into the client system by:

receiving an indication that a corresponding representation of at least one of the retrieved field values or additional field values has been updated on the external system; and in response to receiving the indication, refreshing at least one of the retrieved field values or additional field values in the client cache.

17. The computer system of claim 12, wherein the program module, when executed by the processor, further causes the computer system to integrate external data from the external system into the client system by:

receiving an indication that a corresponding representation of at least one of the retrieved field values or additional field values has been deleted on the external system; and in response to receiving the indication, deleting the at least one of the retrieved field values or additional field values from the client cache.

18. A computer-readable storage medium having computer-executable instructions stored thereon which, when executed by a computer, cause the computer to:

select a subscription file, the subscription file comprising a read method, a query method, an association method, and an explicit identity, the read method defining fields of a client cache operating in a client system;

execute the query method to retrieve, from the external system, field values corresponding to at least a subset of the fields;

associate a refresh rate with the field values;

upon executing the query method, execute the read method to retrieve, from the external system, additional field values corresponding to a remaining subset of the fields that were not retrieved by executing the query method;

execute the association method to retrieve second additional field values from related entities;

utilizing the explicit identity to retrieve third additional field values by specific identifier;

populating the client cache with the field values, the additional field values, the second additional field values, and the third additional field values according to the fields; and refresh the field values according to the refresh rate.

19. The computer-readable storage medium of claim 18, further comprising computer-executable instructions stored thereon which, when executed by the computer, cause the computer to execute the query method in the subscription file according to a parameter to retrieve, from the external system, defined field values corresponding to at least a subset of the fields.

* * * * *